No. 877,316. PATENTED JAN. 21, 1908.
E. F. FISHER.
FERTILIZER DISTRIBUTER.
APPLICATION FILED FEB. 19, 1907.

Witnesses
Hugh H. Ott
Geo. Ackman Jr.

Inventor
Edward F. Fisher
By Victor J. Evans
Attorney

UNITED STATES PATENT OFFICE.

EDWARD F. FISHER, OF ATKINSON, NEBRASKA.

FERTILIZER-DISTRIBUTER.

No. 877,316.     Specification of Letters Patent.     Patented Jan. 21, 1908.

Application filed February 19, 1907. Serial No. 358,257.

To all whom it may concern:

Be it known that I, EDWARD F. FISHER, a citizen of the United States, residing at Atkinson, in the county of Holt and State of Nebraska, have invented new and useful Improvements in Fertilizer-Distributers, of which the following is a specification.

The invention relates to an improvement in fertilizer distributers comprehending specifically a reservoir constructed to provide a convenient means for delivering fertilizer to a particular place of application.

The main object of the present invention is the provision of a distributer so constructed as to enable the user to direct fertilizer to a particular plant or plants in a convenient manner, whereby the entire quantity of fertilizer is effective for the purpose designed and will enrich the soil immediately surrounding the plant.

The invention will be described in the following specification, reference being had particularly to the accompanying drawings, in which:—

Figure 1:
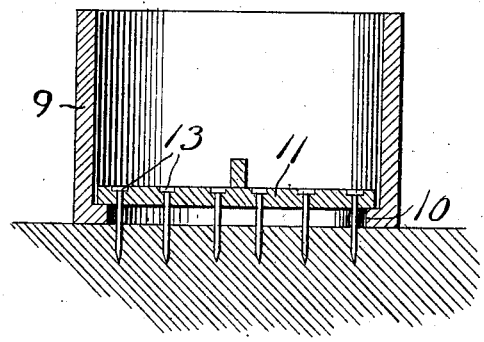
Figure 2:
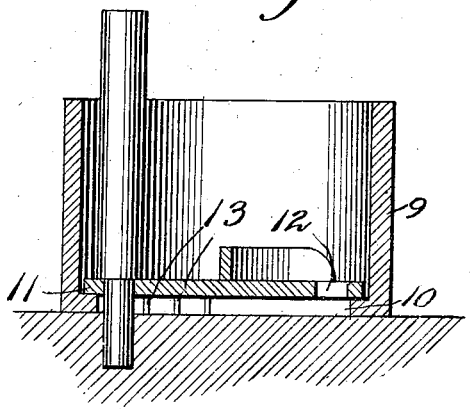
Figure 3:
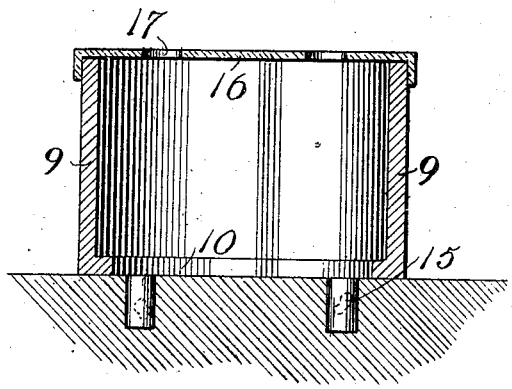
Figure 4:
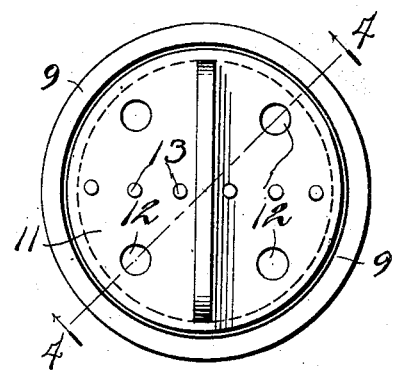

Figure 1 is a vertical section of the distributer, the parts being shown in the positions occupied in initial use, Fig. 2 is a sectional view on line 4—4 of Fig. 4, the well-former being shown in place, Fig. 3 is a similar view of the parts in final position, Fig. 4 is a top plan in the position illustrated in Fig. 1.

In the drawings is illustrated a form of fertilizer distributer primarily adapted for the use of dry fertilizing material. In this form the distributer comprises a receptacle or reservoir 9, preferably molded of cement or similar material and open in its bottom with the exception of an annular ledge 10. A scraping board 11 is adapted for coöperation with the ledge, being diametrically of a size slightly less than the similar dimension of the reservoir adjacent the bottom. The board is formed with circular openings 12 arranged in diametrically opposed pairs, and between the openings is also provided with a row of depending scraping points or teeth 13, which teeth are of materially greater length than the thickness of the ledge 10. In the use of this form of reservoir, dry fertilizer is placed in the reservoir to an extent desired, preferably covering the ground within the bottom opening. The board 11 is now applied, with the teeth disposed in the bottom opening of the reservoir, projecting, of course, through the fertilizer and into the ground. The board is rotated to thoroughly break up the ground below the bottom of the reservoir, and thoroughly mix the fertilizer with the earth.

The board is then arranged to dispose the openings 12 therein as desired, after which formers 14 are forced through the openings 12 and into the loosened ground beneath. This movement of the former provides a well in the ground directly beneath the board opening, and at the same time forces the fertilizing material down to the bottom of said well. The seed, which has been previously incased in a fertilizer cartridge, of papers or the like, is then inserted in the well, after withdrawal of the scraping board. The cartridge is then covered, and a closing cap 16 arranged to close the upper end of the reservoir. Openings 17 are formed in the cap, preferably in alinement with the openings in the reservoir bottom, and the cap is preferably made of glass to permit storage of sufficient germinating heat within the reservoir. Sufficient water from rain or snow is admitted through the openings 17 to give desired moisture to the growing plant.

In the form of the invention illustrated the fertilizing material is directed exactly to the point at which its application is desired, thereby materially increasing the fertilizing effect and avoiding the use of an excess and totally unnecessary supply of fertilizer.

Having thus described the invention what is claimed as new, is:—

1. A fertilizer distributer comprising a fertilizer receiving reservoir formed with an opening in the bottom, means for loosening the earth below the opening, and means for forcing the fertilizer from said openings into the earth.

2. A fertilizer distributer comprising a fertilizer receiving reservoir, the bottom of said reservoir being formed with an opening, means for forming a well in the earth below the reservoir and within the plane of the opening, said means operating to force a portion of the fertilizing material from the reservoir into the well.

3. A fertilizer distributer comprising a reservoir formed with an opening in the bottom, and a scraping board for use within the reservoir and having teeth, said board being capable of independent movement relative to the reservoir.

4. A fertilizer distributer comprising a reservoir formed with an opening in the bottom, a scraping board for use within the reservoir and having teeth, said board being capable of independent movement relative to the reservoir and formed with an opening, and a well former designed to be forced through the opening in the board and form a well in the ground beneath the reservoir.

In testimony whereof, I affix my signature in presence of two witnesses.

EDWARD F. FISHER.

Witnesses:
 DEER AKIN,
 C. BOEHME.